(12) United States Patent
Lin et al.

(10) Patent No.: US 9,331,895 B2
(45) Date of Patent: May 3, 2016

(54) ELECTRONIC APPARATUS AND METHOD FOR CONTROLLING ELECTRONIC DEVICE THEREOF

(71) Applicants: Cheng-Lung Lin, Taipei (TW); Hsing-Yui Yang, Taipei (TW); Ming-Yu Chang, Taipei (TW); Ching-Hsiang Chiang, Taipei (TW)

(72) Inventors: Cheng-Lung Lin, Taipei (TW); Hsing-Yui Yang, Taipei (TW); Ming-Yu Chang, Taipei (TW); Ching-Hsiang Chiang, Taipei (TW)

(73) Assignee: COMPAL ELECTRONICS, INC., Taipei (TW)

( * ) Notice: Subject to any disclaimer, the term of this patent is extended or adjusted under 35 U.S.C. 154(b) by 394 days.

(21) Appl. No.: 13/875,284

(22) Filed: May 2, 2013

(65) Prior Publication Data

US 2014/0237064 A1 Aug. 21, 2014

(30) Foreign Application Priority Data

Feb. 20, 2013 (TW) .............................. 102105911 A

(51) Int. Cl.
*G06F 15/16* (2006.01)
*H04L 12/24* (2006.01)
(Continued)

(52) U.S. Cl.
CPC ............ *H04L 41/046* (2013.01); *H04L 12/282* (2013.01); *H04L 12/2809* (2013.01); *H04L 12/2821* (2013.01); *H04L 67/125* (2013.01)

(58) Field of Classification Search
CPC ... H04L 12/28; H04L 41/046; H04L 12/2812; H04L 67/04; H04L 2012/2849; H04L 67/02; H04L 67/16; H04L 29/06; H04L 29/12018; H04L 41/0213; H04L 41/12; H04L 61/10; H04L 63/02; H04L 63/0492; H04L 63/08; H04L 63/10

See application file for complete search history.

(56) References Cited

U.S. PATENT DOCUMENTS 7,761,885 B2* 7/2010 Labrou et al. ................. 719/330
8,059,621 B2* 11/2011 de Clerq et al. ............... 370/338
(Continued)

FOREIGN PATENT DOCUMENTS

| CN | 102857549 | 1/2013 |
|---|---|---|
| TW | 201248569 | 12/2012 |
| TW | M443172 | 12/2012 |

OTHER PUBLICATIONS

Li et al., CN201750431 U, Smart home centralized controle device, Feb. 16, 2011.*

(Continued)

*Primary Examiner* — Ario Etienne
*Assistant Examiner* — Thorne E Waugh
(74) *Attorney, Agent, or Firm* — Jianq Chyun IP Office

(57) ABSTRACT

A method for controlling an electronic device and an electronic apparatus are provided. A position of the electronic apparatus in a spatial area is obtained. A scene of the spatial area where the electronic apparatus is located is displayed in a display unit. A position of a controllable target apparatus included in the scene is obtained by using the position of the electronic apparatus and searching in a target apparatus distribution database of the spatial area, and a relative position of the controllable target apparatus and the electronic apparatus is obtained. According to the obtained position of the controllable target apparatus, an apparatus image layer corresponding to the controllable target apparatus is displayed at a corresponding position of the scene. When the apparatus image layer receives an enabling signal, a controlling command is transmitted to the controllable target apparatus corresponding to the apparatus image layer.

20 Claims, 15 Drawing Sheets

(51) Int. Cl.
  *H04L 12/28* (2006.01)
  *H04L 29/08* (2006.01)

(56) References Cited

U.S. PATENT DOCUMENTS

| | | | |
|---|---|---|---|
| 8,244,742 B2* | 8/2012 | Yoon et al. | 707/756 |
| 2010/0138900 A1* | 6/2010 | Peterka et al. | 726/4 |
| 2012/0059846 A1* | 3/2012 | Sung et al. | 707/769 |
| 2012/0287034 A1* | 11/2012 | Park et al. | 345/156 |
| 2012/0297019 A1* | 11/2012 | Ting | 709/217 |
| 2013/0086168 A1* | 4/2013 | Han et al. | 709/204 |
| 2014/0188335 A1* | 7/2014 | Madhok et al. | 701/36 |
| 2015/0050947 A1* | 2/2015 | Wirola et al. | 455/456.1 |

OTHER PUBLICATIONS

"Office Action of Taiwan Counterpart Application", issued on Apr. 14, 2015, p. 1-p. 10.

* cited by examiner

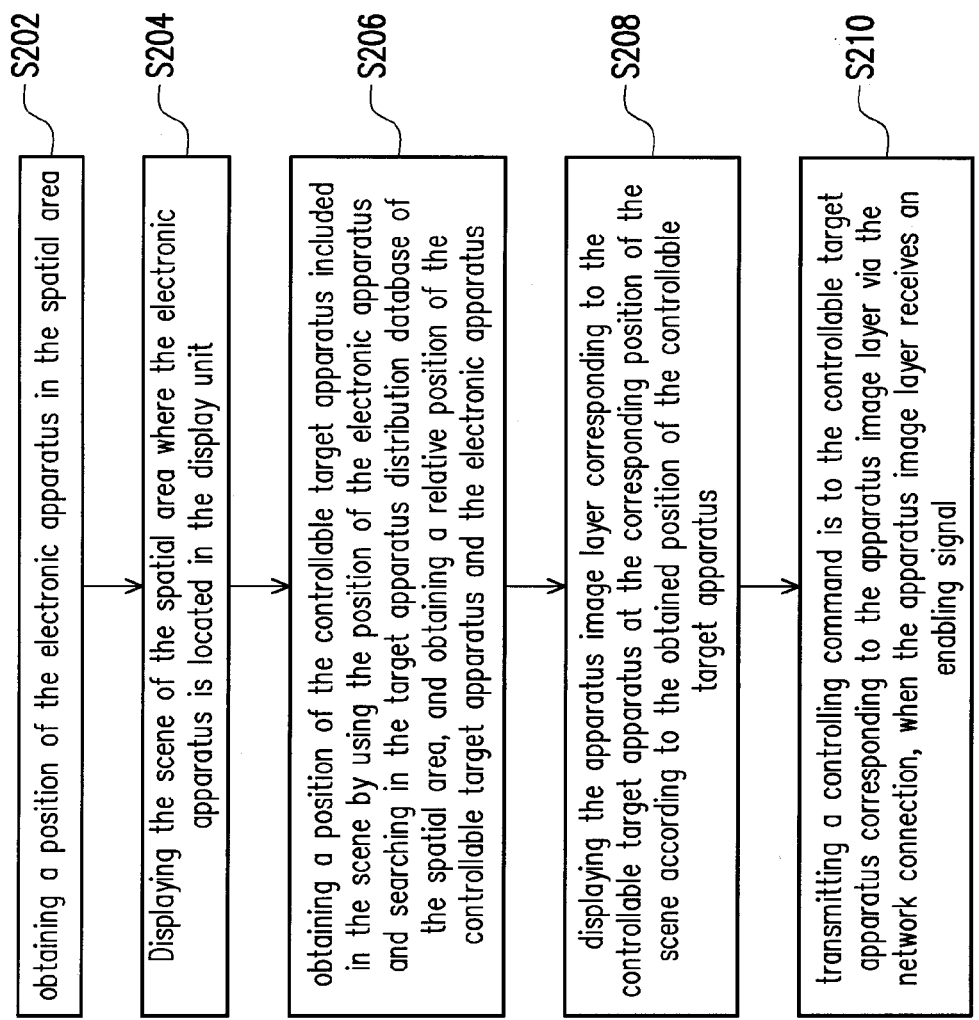

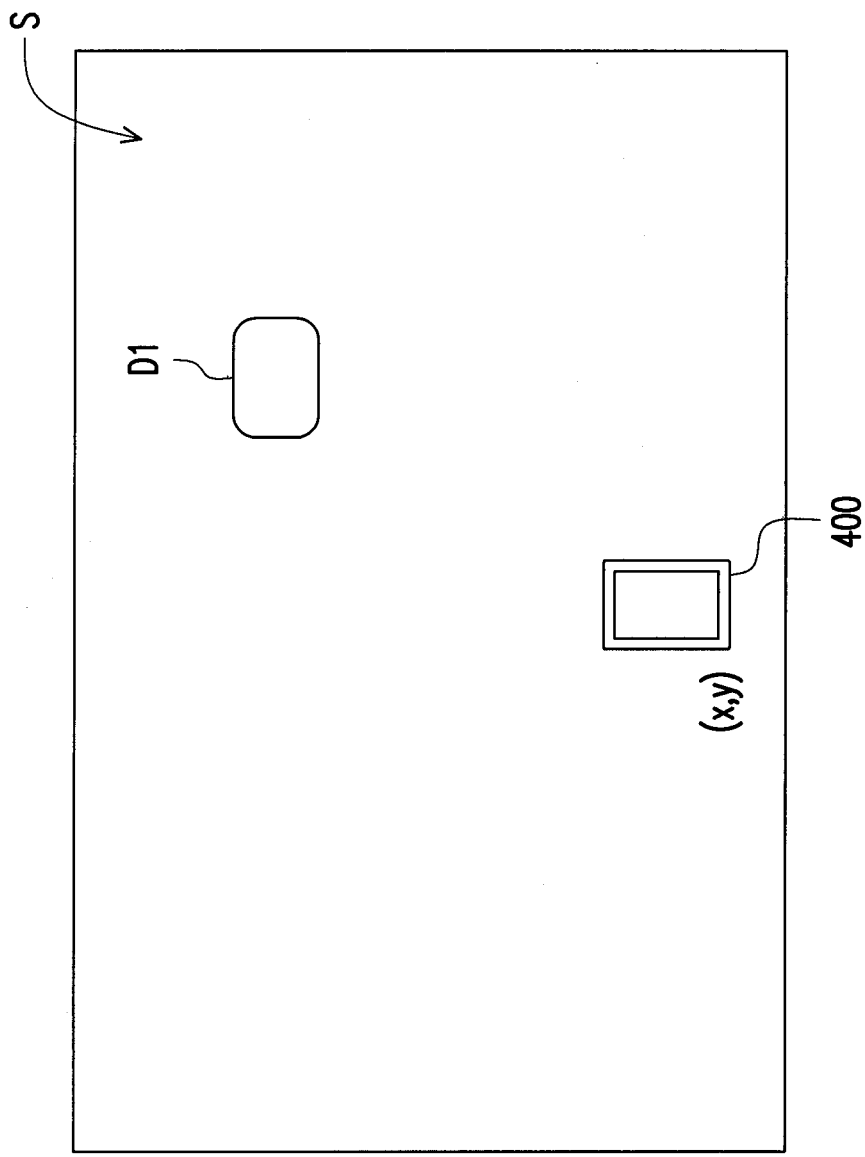

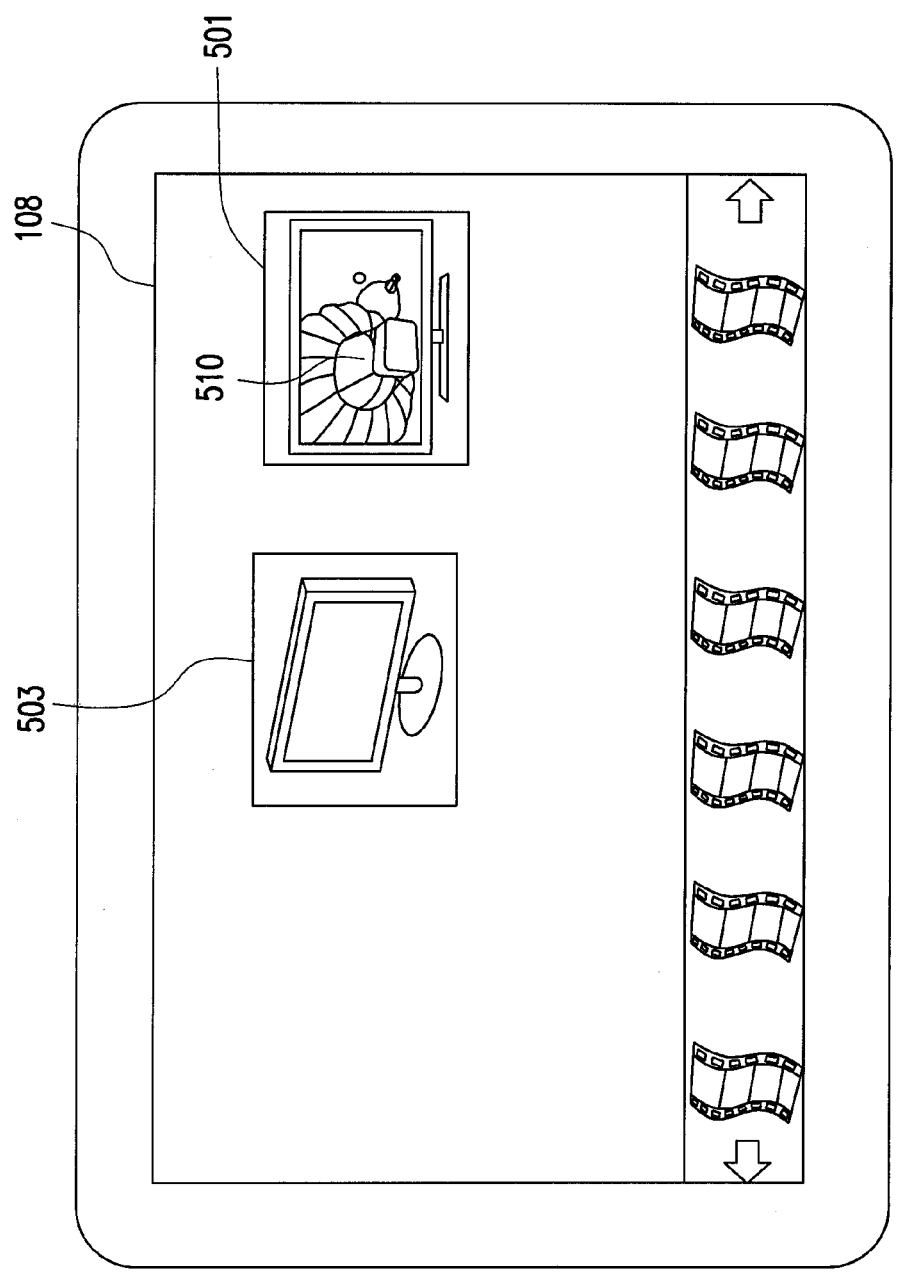

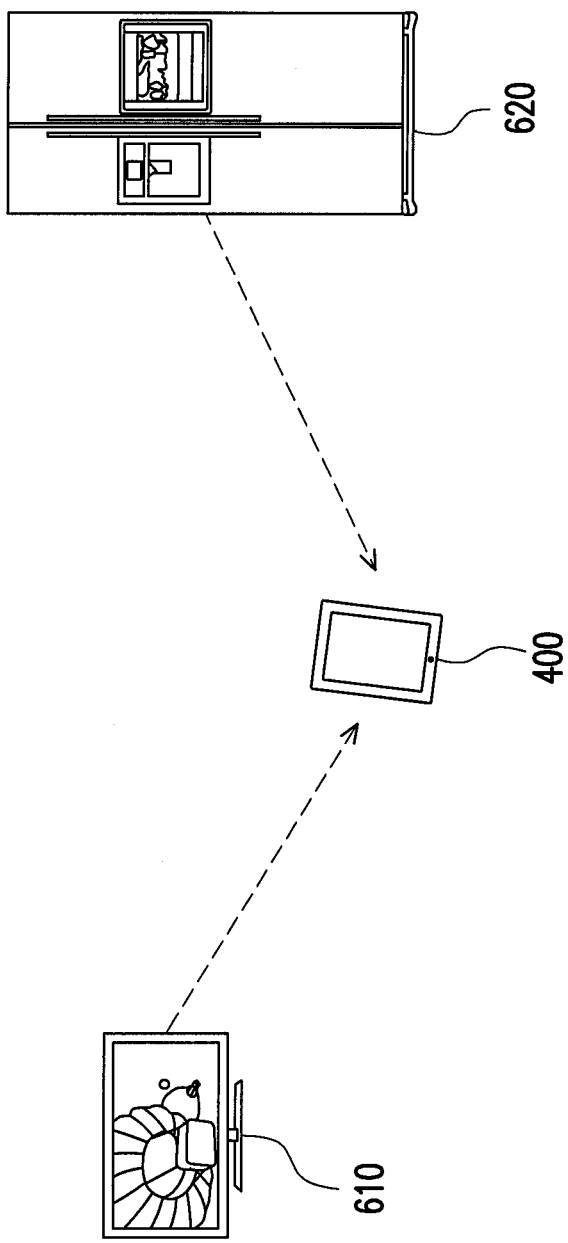

ELECTRONIC APPARATUS AND METHOD FOR CONTROLLING ELECTRONIC DEVICE THEREOF

CROSS-REFERENCE TO RELATED APPLICATION

This application claims the priority benefit of Taiwan application serial no. 102105911, filed on Feb. 20, 2013. The entirety of the above-mentioned patent application is hereby incorporated by reference herein and made a part of this specification.

BACKGROUND OF THE INVENTION

1. Field of the Invention

The invention relates to an electronic device controlling mechanism, and more particularly to a method for controlling an electronic device and an electronic apparatus applied to digital home network.

2. Description of Related Art

Digital Living Network Alliance (DLNA) has established a standardized transmission specification for enabling communication between products of different manufacturers, with which video apparatuses that meet the DLNA protocol are able to be directly connected, to work synchronically, and even to transmit data.

In the home network, the electronic devices (such as a digital media player apparatus, a digital media server, etc.) that are in the same area network and meet the DLNA protocol are able to share and play files or to read the shared files via the network. For example, after being connected to a digital media server, the digital media player apparatus may give a command to the digital media server and to transmit multimedia data to the digital media player apparatus via the network.

Under the DLNA, the current application program interfaces for transmitting shared files display the names of apparatuses mainly in menus or lists for users to transmit the files to be shared to the selected apparatus. However, the users are unable to quickly recognize a corresponding apparatus with the apparatus names listed in the menu or list; consequently, the users are confused by the apparatuses with similar names. In addition, the current menus or lists capable of supporting apparatus names are only capable of providing information such as brands and specifications of the apparatuses. In that case, if there are a number of apparatuses with the same name in the same working environment, the users will be unable to distinguish the apparatuses from one and another through the menu or list, which will cause the files to be shared to be transmitted to a wrong apparatus by mistake and consequently lead to a lot of inconvenience.

SUMMARY OF THE INVENTION

The invention provides a method for controlling an electronic device and an electronic apparatus; users are able to easily and accurately determine the electronic device to be controlled through the electronic apparatus.

The invention provides a method for controlling an electronic device, for an electronic apparatus. In the method, a position of the electronic apparatus in a spatial area is obtained. A scene of the electronic apparatus in the spatial area is displayed in a display unit connected to the electronic apparatus. A position of a controllable target apparatus included in the scene is obtained by using the position of the electronic apparatus and searching in a target apparatus distribution database of the spatial area, and a relative position of the controllable target apparatus and the electronic apparatus is also obtained. According to the obtained relative position of the controllable target apparatus and the electronic apparatus, an apparatus image layer corresponding to the controllable target apparatus is dynamically displayed at a corresponding position of the scene. When the apparatus image layer receives an enabling signal, a controlling command is transmitted to the controllable target apparatus corresponding to the apparatus image layer through network connection.

In an embodiment of the invention, the aforementioned spatial area includes a plurality of electronic devices, and the controllable target apparatus is one of the electronic devices; moreover, a method for controlling the electronic device further includes performing a positioning action to obtain the position of the electronic apparatus in the spatial area. Performing the positioning action includes steps of detecting a plurality of signal strength values of the electronic devices in the spatial area via a signal detecting unit; and obtaining a position of the electronic apparatus in the spatial area using the signal strength values according to the target apparatus distribution database.

In an embodiment of the invention, the target apparatus distribution database includes a plurality of signal information and position information of individual electronic device, wherein the signal information respectively includes the signal strength value received from individual electronic device in a plurality of coordinate positions in the spatial area.

In an embodiment of the invention, in the step of dynamically displaying the apparatus image layer corresponding to the controllable target apparatus at the corresponding position of the scene according to the obtained relative position of the controllable target apparatus and the electronic apparatus, a distance between the controllable target apparatus and the electronic apparatus is calculated dynamically according to the position of the electronic apparatus and the position of the controllable target apparatus, and a display size of the apparatus image layer is adjusted according to the distance.

In an embodiment of the invention, in the step of dynamically displaying the apparatus image layer corresponding to the controllable target apparatus at the corresponding position of the scene according to the obtained relative position of the controllable target apparatus and the electronic apparatus, if the scene includes another controllable target apparatus, it is determined whether the distribution of the apparatus image layer and said another apparatus image layer are overlapping or independent according to respective positions of the controllable target apparatus and said another controllable target apparatus.

In an embodiment of the invention, in the step of displaying the scene of the electronic apparatus in the spatial area in the display unit connected to the electronic apparatus, the scene of the electronic apparatus in the spatial area may be received via an image capturing unit so as to display the scene in the display unit.

In an embodiment of the invention, in the step of displaying the scene of the electronic apparatus in the spatial area in the display unit connected to the electronic apparatus, when the electronic apparatus is detected to be in a first operation mode, the scene received via the image capturing unit is displayed in the display unit. In addition, when the electronic apparatus is detected to be in a second operation mode, a default view is displayed. Moreover, an arrow is displayed to point at the position of the controllable target apparatus according to the obtained relative position of the controllable target apparatus and the electronic apparatus.

In an embodiment of the invention, in the step of displaying the scene of the electronic apparatus in the spatial area in the display unit connected to the electronic apparatus, when the electronic apparatus is detected to be in the first operation mode, an augmented reality image of the scene is displayed in the display unit, wherein the augmented reality image corresponds to the scene. In addition, when the electronic apparatus is detected to be in the second operation mode, the default view is displayed, and the arrow is displayed to point at the position of the controllable target apparatus according to the obtained relative position of the controllable target apparatus and the electronic apparatus.

In an embodiment of the invention, in the step of displaying the scene of the electronic apparatus in the spatial area in the display unit connected to the electronic apparatus, a layout diagram of the spatial area is displayed in the display unit, wherein the layout diagram corresponds to the scene.

The invention provides an electronic apparatus, including a processing unit, a storage unit, a display unit, a sensing unit, and a communication unit. The processing unit is coupled to the storage unit, the display unit, the sensing unit, and the communication unit. The processing unit obtains a position of the electronic apparatus in a spatial area. The storage unit stores a target apparatus distribution database of the spatial area. The display unit displays the scene of the electronic apparatus in the spatial area. The sensing unit detects a facing direction of the electronic apparatus. The processing unit obtains a relative position of the controllable target apparatus and the electronic apparatus included in the scene using the position of the electronic apparatus and the target apparatus distribution database. The processing unit decides the scene displayed by the display unit according to the detected facing direction. Moreover, the processing unit determines the scene to be displayed in the display unit according to the detected facing direction. Also, the processing unit dynamically displays an apparatus image layer corresponding to the controllable target apparatus at a corresponding position of the scene via the display unit according to the obtained relative position of the controllable target apparatus and the electronic apparatus. When the apparatus image layer receives an enabling signal, the processing unit transmits a controlling command to the controllable target apparatus corresponding to the apparatus image layer via the communication unit.

In an embodiment of the invention, the electronic apparatus further includes a signal detecting unit coupled to the processing unit. The signal detecting unit detects a plurality of signal strength values of a plurality of electronic devices in the spatial area, wherein the controllable target apparatus is one of the electronic devices. The processing unit obtains the position of the spatial area where the electronic apparatus is located using the signal strength values according to the target apparatus distribution database.

In an embodiment of the invention, the target apparatus distribution database includes a plurality of signal information and position information of individual electronic device, wherein the plurality of signal information is the signal strength values respectively received from the electronic apparatuses in the plurality of coordinate positions in the spatial area.

In an embodiment of the invention, the processing unit calculates a distance between the controllable target apparatus and the electronic apparatus according to the position of the electronic apparatus and the position of the controllable target apparatus, and adjusts a display size of the apparatus image layer according to the distance.

In an embodiment of the invention, the electronic apparatus further includes an image capturing unit coupled to the processing unit. The processing unit receives the scene of the spatial area in a facing direction via the image capturing unit to display the scene in the display unit.

In an embodiment of the invention, when the sensing unit detects that the electronic apparatus is in a first operation mode, the scene received via the image capturing unit is displayed in the display unit.

In an embodiment of the invention, when the sensing unit detects that the electronic apparatus is in a second operation mode, the processing unit displays a default view in the display unit and displays an arrow to point at the position of the controllable target apparatus according to the obtained relative position of the controllable target apparatus and the electronic apparatus. Alternatively, when the sensing unit detects that the electronic apparatus is in the second operation mode, the processing unit displays a layout diagram of the spatial area in the display unit, wherein the layout diagram corresponds to the scene.

Based on the above, the electronic apparatus can obtain the controllable target apparatus included in the scene and the position of the controllable target apparatus via the position of the electronic apparatus. Furthermore, according to the position of the controllable target apparatus, the electronic apparatus can display the apparatus image layer corresponding to the controllable target apparatus at the corresponding position of the scene, such that the user is able to directly recognize the controllable target apparatus through the electronic apparatus so as to accurately determine the controllable target apparatus to be controlled.

In order to make the aforementioned features and advantages of the invention more comprehensible, embodiments accompanying figures are described in detail below.

BRIEF DESCRIPTION OF THE DRAWINGS

FIG. 2 is a flow chart illustrating a method for controlling an electronic device according to the first embodiment of the invention.

FIGS. 5A-5D are schematic diagrams illustrating moving the apparatus image layer according to the third embodiment of the invention.

FIGS. 6A-6C are schematic diagrams illustrating calculating a position of the electronic apparatus according to the third embodiment of the invention.

DESCRIPTION OF EMBODIMENTS

In digital home network, if a user is able to recognize an electronic device according to an image layer provided in a user interface when operating each electronic device, and is able to distinguish each electronic device from one and another according to a relative position of the apparatus to share resources with the electronic devices corresponding to the image layer via the user interface, it must be easier for the user to use the digital home network. The invention provides a method for controlling the electronic device and an electronic apparatus based on the aforementioned aspects. In order to make the aforementioned features of the invention more comprehensible, embodiments based on which the invention may actually be implemented are provided below.

First Embodiment

Figure 1A:
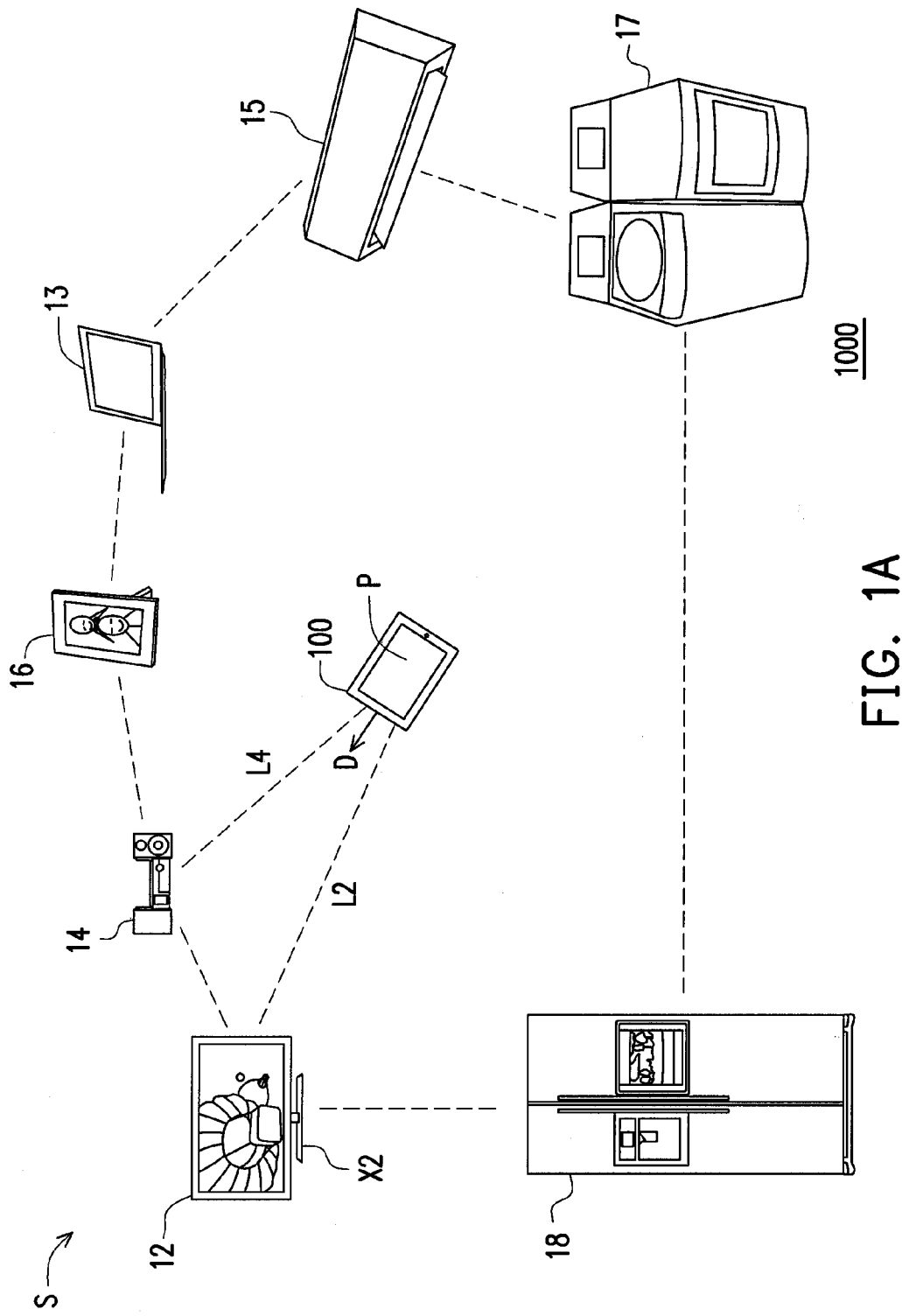
FIG. 1A is a schematic diagram illustrating an electronic device controlling system according to a first embodiment of the invention.

FIG. 1A is a schematic diagram illustrating an electronic device controlling system according to a first embodiment of the invention. Referring to FIG. 1A, an electronic device controlling system 1000 includes an electronic apparatus 100 and a plurality of electronic devices 12-18, wherein the electronic apparatus 100 and the electronic devices 12-18 are located in a spatial area S, and the electronic device controlling system 1000 meets a digital home network protocol. In the digital home network environment, the electronic devices 12-18 are, for example, computers, cell phones, servers, players, etc. that meet the digital home network protocol and are capable of sharing, receiving stream and playing files such as videos, music, photos, and so on through the network connection. In addition, the electronic apparatus 100 is, for example, a notebook computer, a tablet PC, a cell phone, a personal digital assistant (PDA) cell phone, a smart phone, a digital camera, or so on, which should not be construed as a limitation to the invention. In the embodiment, the electronic apparatus 100 is capable of controlling and operating every controllable target apparatus, wherein the controllable target apparatus is one of the electronic devices 12-18, based on which the method for controlling and operating the electronic device in the embodiment is implemented. In addition, although seven electronic devices are illustrated in FIG. 1A of the embodiment, the embodiment provides no limitation to the number of the electronic device in the spatial area S.

Figure 1B:
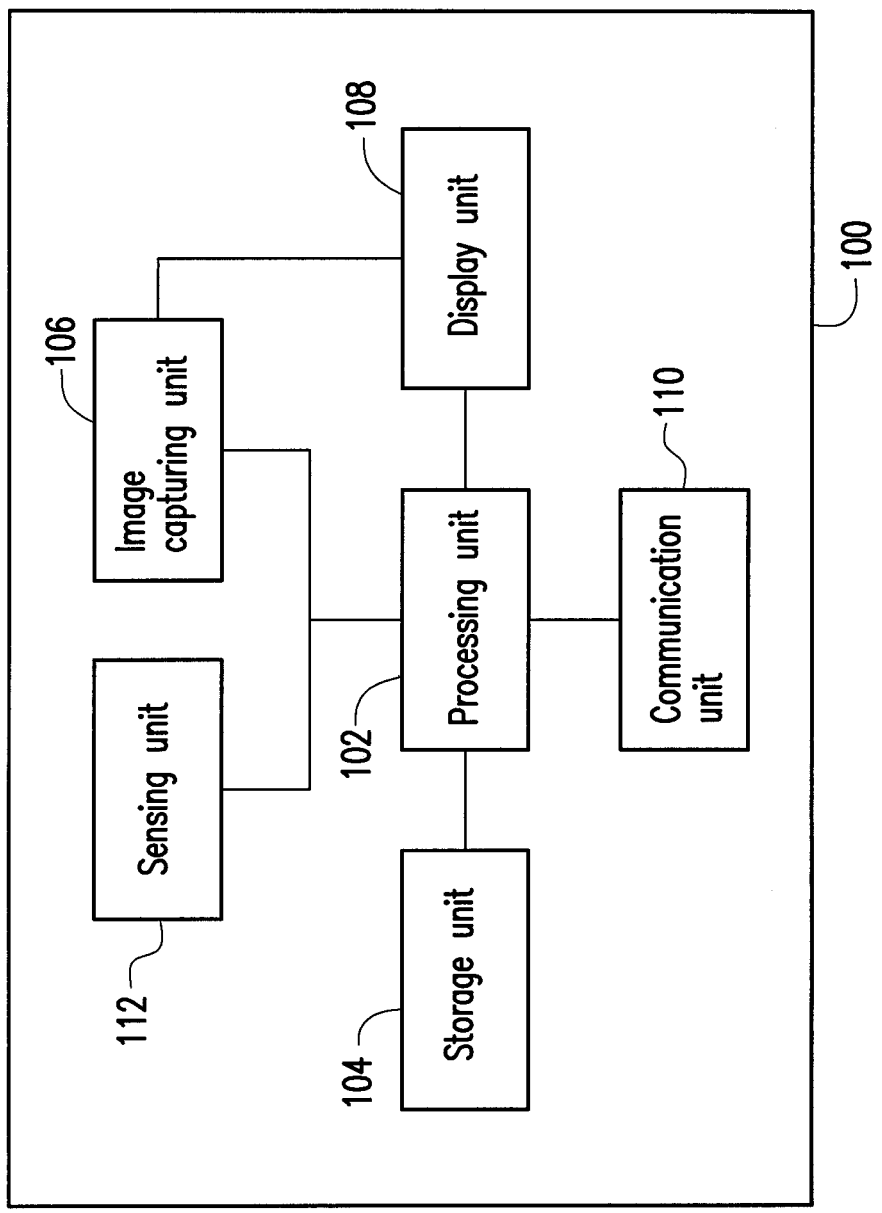
FIG. 1B is a block diagram illustrating an electronic apparatus according to the first embodiment of the invention.

FIG. 1B is a block diagram illustrating an electronic apparatus according to the first embodiment of the invention. Referring to both FIGS. 1A and 1B, the electronic apparatus 100 includes a processing unit 102, a storage unit 104, a communication unit 110, a sensing unit 112, and a display unit 108. In addition, an image capturing unit 106 may be selectively disposed in the electronic apparatus 100.

The processing unit 102 may be a hardware component (such as a chip set, a processor, and so on) with calculation ability, a software element (such as an operation system, an application program, and so on), or a combination of both for controlling the overall operation of the electronic apparatus 100. Specifically, with the calculation of the processing unit 102 and the sensing unit 112 coupled to the processing unit 102, a position P in the spatial area S where the electronic apparatus 100 is located, a facing direction D, and a distance may be obtained, so as to obtain the controllable target apparatus included in the scene in the spatial area S and to obtain a relative position of the controllable target apparatus and the electronic apparatus 100. In the embodiment, the processing unit 102 is, for example, a central processing unit (CPU), other programmable microprocessors, a digital signal processor (DSP), a programmable controller, an application specific integrated circuits (ASIC), a programmable logic device (PLD), or the like.

The storage unit 104 is coupled to the processing unit 102. The storage unit 104 stores a target apparatus distribution database of the spatial area S for the processing unit 102 to use. Alternatively, the target apparatus distribution database may not be existed in the storage unit 104; instead, the target apparatus distribution database may come through being shared by any one of the electronic devices in the electronic device controlling system 1000. For example, the target apparatus distribution database records a plurality of electronic devices information, including the names, icons, signal information (such as RSSI (received signal strength indicator)), and a distance of the plurality of electronic devices as well as the position information of each of the electronic devices 12-18. In addition, the storage unit 104 may also be stored in one or a plurality of files in the electronic apparatus 100. In the embodiment, the storage unit 104 may be an embedded internal storage unit or an external storage unit. The internal storage unit may be a random access memory (RAM), a read-only memory (ROM), a flash memory, a magnetic disk storage device, and so on. The external storage unit may be a compact flash (CF) memory card, a secure digital (SD) memory card, a micro SD memory card, a memory stick (MS), and the like.

The sensing unit 112 is coupled to the processing unit 102. The sensing unit 112 is, for example, a touch sensor, a G-sensor, a gyro sensor, a distance sensor, a 3-axis accelerating sensor, a compass sensor, a pressure sensor, a humidity sensor, or a light source sensor for detecting a moving distance and the facing direction D of the electronic apparatus 100, which should not be construed as a limitation to the invention.

The display unit 108 is coupled to the image capturing unit 106 and the processing unit 102. In the embodiment, the display unit 108 is, for example, a liquid-crystal display (LCD), a plasma display, a vacuum fluorescent display, a light-emitting diode (LED) display, a field emission display (FED), and/or other suitable displays. The display unit 108 displays the scene of the electronic apparatus 100 in the spatial area S in the facing direction D. In addition, the display unit 108 displays an apparatus image layer corresponding to the controllable target apparatus at a corresponding position in the scene according to a relative position of the controllable target apparatus and the electronic apparatus 100 obtained by the processing unit 102.

To be specific, a user interface may be further displayed via the display unit 108 and the apparatus image layer may be displayed in the user interface. Furthermore, the user interface may display the scene in different manners according to the user's selection. For example, in the case where an image capturing unit 106 is disposed, the image capturing unit 106 may be used to receive the scene of the electronic apparatus 100 in the spatial area, such that an augmented reality image of the scene can be displayed in the display unit 108. For example, the display unit 108 provides a user interface to display an actual image of the spatial area S, and then the apparatus image layer is disposed on the actual image, thereby forming an augmented reality image. Alternatively, in the case where the image capturing unit 106 is not disposed, the user interface displays a layout diagram or a virtual reality diagram of the spatial area S, and the apparatus image layer is disposed therein. Also, the user interface may display an arrow pointing at a position of the controllable target apparatus. In the case where the image capturing unit 106 is disposed, the layout diagram or the virtual reality diagram of the spatial area S may also be displayed in the user interface, which should not be construed as a limitation to the invention. In addition, the apparatus image layer displayed by the display unit 108 may also receive an enabling signal given by the user via the user interface (for example, the user can click on the apparatus image layer to give a command), such that the electronic apparatus 100 performs a corresponding operation.

A communication unit 110 transmits a controlling command or an operation command in the electronic apparatus 100 to the controllable target apparatus corresponding to an enabled apparatus image layer, wherein the controlling command and the operation command are, for example, used for playing multi-media files, turning on or off the electronic device, and so on, which should not be construed as a limitation to the invention. In the embodiment, the communication unit 110 is, for example, a network element (such as a network card) which supports connection function for transmitting the controlling command to the controllable target apparatus.

In addition, the image capturing unit 106 may also be selectively disposed in the embodiment. The image capturing unit 106 is coupled to the processing unit 102 and receives the scene of the electronic apparatus 100 in the spatial area S in the facing direction D. The image capturing unit 106 is, for example, a video camera or a camera with a charge coupled device (CCD) lens, a complementary metal oxide semiconductor transistors (CMOS) lens, or an infrared lens. However, the invention is not limited thereto.

To allow people skilled in the art to further understand the method for controlling the electronic device and the electronic apparatus using the same in the embodiment, the electronic apparatus 100 is used in the following descriptions to explain each step in the method for controlling the electronic device in the embodiment. FIG. 2 is a flow chart illustrating a method for controlling an electronic device according to the first embodiment of the invention. The method for controlling the electronic device in the embodiment is adaptable for controlling one or a plurality of controllable target apparatuses via the electronic apparatus 100, for example, to transmit a file in the electronic device controlling system 1000 to one or a plurality of controllable target apparatuses. Moreover, in the DLNA protocol, the file is stored in a server, such that the method for controlling the electronic device is executed via the electronic apparatus 100 to control the server to transmit the file to one or a plurality of controllable target apparatuses.

Referring to FIGS. 1A, 1B, and 2. In step S202, the processing unit 102 calculates a position P of the electronic apparatus 100 in the spatial area S. Moreover, the facing direction D and the moving distance of the electronic apparatus 100 may further be detected via the sensing unit 112. For example, if an external force is applied to the electronic apparatus 100, the sensing unit 112 is capable of immediately detecting an acceleration variation generated by the electronic apparatus 100 and then acquiring the moving distance of the electronic apparatus 100 based on calculated values of acceleration, and using the gyro sensor and the compass sensor to acquire the facing direction D of the electronic apparatus 100. Thereby, the processing unit 102 is capable of acquiring a current facing direction D of the electronic apparatus 100 according to the detection result from the sensing unit 112.

In step S204, the scene of the electronic apparatus 100 in the spatial area is displayed in the display unit 108. For example, the scene of the electronic apparatus 100 in the spatial area in the facing direction D may be displayed. In the embodiment, the processing unit 102 is capable of receiving the scene in the spatial area in the facing direction D via the image capturing unit 106 to display a real scene in the display unit 108. In other embodiments, the processing unit 102 may also display the scene of the layout diagram or the virtual reality diagram of the spatial area S in the facing direction D in the display unit 108.

Next, in step S206, the processing unit 102 obtains the position of the controllable target apparatus included in the scene using the position P of the electronic apparatus 100 and searching in the target apparatus distribution database of the spatial area S, so as to obtain a relative position of the controllable target apparatus and the electronic apparatus. For example, the processing unit 102 obtains the position of the controllable target apparatus included in the scene using the position P and the facing direction D to search in the target apparatus distribution database of the spatial area S, so as to obtain a position of the controllable target apparatus.

Specifically, the processing unit 102 is capable of performing an action of positioning the electronic apparatus 100 according to a signal strength value detected by a RF signal detecting unit such as wireless receiving/transmitting unit to obtain the position P of the electronic apparatus 100 in the spatial area S. For example, the processing unit 102 may respectively receive the signal strength value generated by each of the plurality of electronic devices in the spatial area S, and to search in the target apparatus distribution database using the signal strength value, thereby calculating the position P of the electronic apparatus 100 in the spatial area S, wherein the target apparatus distribution database may include the position information of each of the electronic devices, and the RF signal strength value received by the electronic apparatus 100 from each of the electronic devices in a plurality of coordinate positions in the spatial area S.

In the embodiment, the processing unit 102 may calculate a relative distance between each of the electronic devices 12-18 in the spatial area S and the position P according to the target apparatus distribution database, so as to calculate the position information regarding the disposition of each of the electronic devices 12-18 relative to the electronic apparatus 100. For example, the processing unit 102 may use the electronic apparatus 100 as a reference coordinate to calculate the position information of each of the electronic devices 12-18 based on the target apparatus distribution database. Thereby, the processing unit 102 is able to obtain the electronic device disposed in the scene in the facing direction D and corresponding position information. In addition, a direction and height of the electronic apparatus 100 relative to that of each of the electronic devices 12-18 might be used in further calculation In step S208, the processing unit 102 displays the apparatus image layer corresponding to the controllable target apparatus at the corresponding position in the scene via the display unit 108 according to the obtained relative position of the controllable target apparatus and the electronic apparatus 100. In addition, a user interface may be further displayed via the display unit 108, thereby presenting the scene of the electronic apparatus 100 in the facing direction D in the user interface. Moreover, in the scene displayed by the display unit 108, the controllable target apparatus in the scene is represented by the apparatus image layer so that the user can directly recognize the controllable target apparatus through the apparatus image layer.

It should be noted that when the image capturing unit 106 is disposed in the embodiment, the processing unit 102 is capable of automatically switching the user interface in the display unit 108, such that the display unit 108 can dynamically display the obtained relative position of the controllable target apparatus and the electronic apparatus 100 according to different display manners.

For example, the sensing unit 112 is used to detect an operation mode of the electronic apparatus 100. Assume that the electronic apparatus has two operation modes, hereafter a first operation mode and a second operation mode. When the sensing unit 112 detects that a tilting angle between a display surface of the display unit 108 and a horizontal surface is between 90 degrees to 135 degrees, it means that the electronic apparatus 100 is in the first operation mode. On the other hand, when the sensing unit 112 detects that the tilting angle between the display surface of the display unit 108 and the horizontal surface is greater than 135 degrees or less than 80 degrees, it means that the electronic apparatus 100 is in the second operation mode. For example, when the user holds the electronic apparatus 100, making the display surface of the display unit 108 to be nearly vertical, it means that the electronic apparatus 100 is in the first operation mode; on the other hand, when the user holds the electronic apparatus 100, making the display surface of the display unit 108 to be nearly horizontal, it means that the electronic apparatus 100 is in the second operation mode.

When the sensing unit 112 detects that the electronic apparatus 100 is in the first operation mode, the processing unit 102 displays an actual scene captured by the image capturing unit 106 in the display unit 108, and displays a corresponding position of the controllable target apparatus in the scene. On the other hand, when the sensing unit 112 detects that the operation mode of the electronic apparatus 100 is the second operation mode, the processing unit 102 does not display a scene in the display unit 108. Instead, the processing unit 102 displays an arrow to point at the obtained relative position of the controllable target apparatus and the electronic apparatus 100. However, the first operation mode and the second operation mode are only one of the embodiments, and the modes are not necessarily switched based on the tilting angle. Also, the modes are not necessarily determined based on the presence of the image capturing unit 106. In other embodiments, the first operation modes and the second operation modes can even coexist and therefore no need to be switched.

Finally, in step S210, when the apparatus image layer receives an enabling signal, the processing unit 102 transmits a controlling command to the controllable target apparatus corresponding to the apparatus image layer via the communication unit 110, wherein the enabling signal is, for example, a command input from a hand gesture from the user (such as a clicking action or a dragging action), or a command input by the user through pressing a key, or a voice command, which should not be construed as a limitation to the invention. The controlling command is, for example, used for playing a multimedia file, turning on or off the electronic device, and so on; the invention is not limited thereto.

A controlling command is used below as an example for a command of playing a file for further description. A plurality of files may be displayed in the user interface in the display unit 108, thereby allowing the user to select the file to be controlled and operated on the user interface. Moreover, when the user performs a hand gesture to one of the apparatus image layers, the processing unit 102 will execute a corresponding procedure based on the hand gesture; thereafter, the selected file will be executed in the controllable target apparatus (assume that to be an electronic device 12 in FIG. 1) corresponding to the apparatus image layer.

For example, when the selected file is saved in the electronic apparatus 100, the processing unit 102 is capable of transmitting the file to the electronic device 12 corresponding to the apparatus image layer via the communication unit 110. In addition, after the communication unit 110 transmits the file to the controllable target apparatus, the processing unit 102 is also capable of further controlling the controllable target apparatus to execute the file according to the controlling command or the operation command given by the user.

Additionally, when the file is saved in another electronic device (assume that to be an electronic device 13 in FIG. 1) different from the electronic apparatus 100, the electronic apparatus 100 sends a command of playing the file to a matching electronic device that plays the file, such as the electronic device 12. For example, after receiving the command, the electronic device 12 is connected to the electronic device 13 where the file is saved to download the file and play it. Take the digital living network alliance (DLNA) protocol as an example, and then the electronic apparatus 100 is used as digital media controller (DMC), the electronic device 12 is used as a digital media player (DMP), and the electronic device 13 is used as a digital media server (DMS).

In addition, when the file is initially saved in the electronic device 12, the electronic apparatus 100 only gives an executing command of play to the electronic device 12 so as to execute the selected file in the electronic device 12.

In that case, the user can accurately recognize the controllable target apparatus based on the scene and the apparatus image layer displayed by the display unit 108, so as to easily transmit the file to the controllable target apparatus or to control the controllable target apparatus through the electronic apparatus 100. In the embodiment, the controllable target apparatus, for example, plays the file using a streaming manner.

Second Embodiment

In order to allow people skilled in the art to further understand the method for controlling the electronic device and the electronic apparatus using the same in the embodiment, more embodiments are provided below for further description, wherein the electronic device controlling system 1000 in FIG. 1A and the electronic apparatus 100 in FIG. 1B are used for detailed description.

Figure 3A:
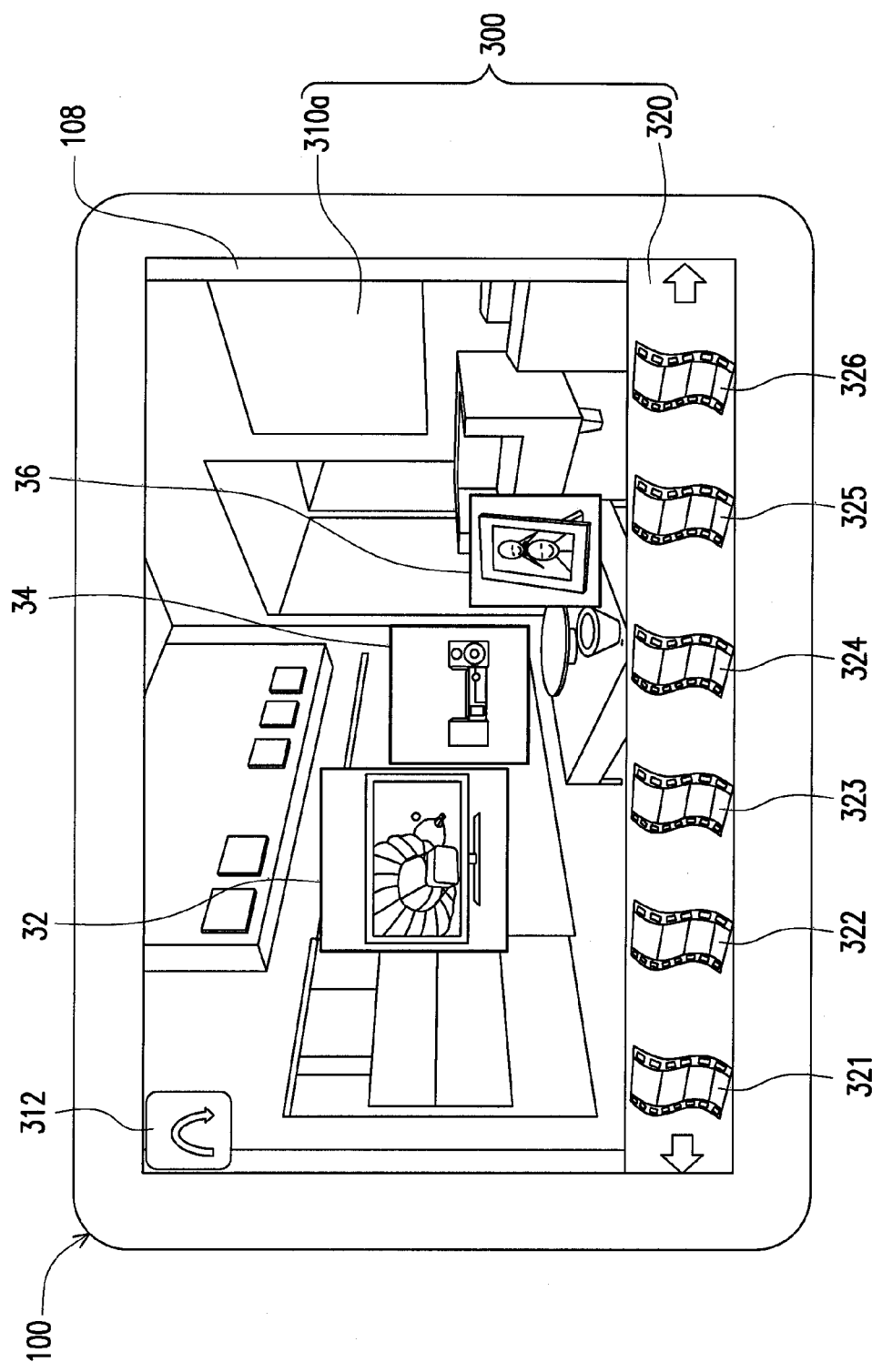
FIG. 3A is a schematic diagram illustrating showing an apparatus image layer in a display frame according to a second embodiment of the invention.

FIG. 3A is a schematic diagram illustrating showing an apparatus image layer in a display frame according to a second embodiment of the invention. Referring to FIG. 3A, a user interface 300 is displayed in the display unit 108 of the electronic apparatus 100, and the user interface 300 may be divided into an apparatus image layer display area 310a and a file selecting area 320, wherein the apparatus image layer display area 310a has a mode switching button 312 for switching the presenting manner in the apparatus image layer display area 310a, and the file selecting area 320 has a plurality of files 321-326. In the embodiment, a background image layer in the apparatus image layer display area 310a is presented immediately through a photo preview of the image capturing unit 106 (e.g. a rear lens). Meanwhile, an apparatus image layer is additionally disposed on the immediate presentation of the photo preview, thereby forming an augmented reality image. In the embodiment, the apparatus image layer display area 310a is presented by employing the facing direction (e.g. a direction that the rear lens faces) of the electronic apparatus 100 held by the user and the current position of the electronic apparatus 100, which are compared with the position information of each electronic device in the target apparatus distribution database, so as to filter the electronic device that currently appears in the facing direction of the electronic apparatus 100, and then an apparatus image layer corresponding to the obtained electronic device through filtration is displayed in a corresponding position.

Referring to FIGS. 1A, 1B, and 3A, firstly, the processing unit 102 obtains the position P and the facing direction D of the electronic apparatus 100 in the spatial area S, receives the scene of the spatial area S in the facing direction D via the image capturing unit 106, and displays the scene of the spatial area S in the facing direction D in the apparatus image layer display area 310a via the display unit 108.

In the embodiment, assume that the processing unit 102 uses the position P and the facing direction D to search in the target apparatus distribution database of the spatial area S, and then obtains a plurality of controllable target apparatus included in the scene, including electronic devices 12, 14 and 16. The electronic device 12 is used below for description and likewise for the electronic devices 14 and 16. Additionally, in other embodiments, the number of the controllable target apparatus included in the scene is not limited to three; it may be more or less.

As shown in FIG. 3A, after the processing unit 102 searches in the target apparatus distribution database of the spatial area S, a position of the electronic device 12 (i.e. the controllable target apparatus) is obtained. The position of the electronic device 12 is denoted by X2 hereafter (hereafter position X2). Meanwhile, in the scene displayed in the apparatus image layer display area 310a, an apparatus image layer 32 corresponding to the electronic device 12 is displayed in a corresponding position according to the position X2.

In this case, assume that the user selects a file 322 from the file selecting area 320, and then when the apparatus image layer 32 receives the enabling signal, the processing unit 102 in the electronic apparatus 100 transmits the file 322 to the electronic device 12 corresponding to the apparatus image layer 32 via the communication unit 110. Specifically, assume that the user performs a dragging action in the file selecting area 320 (as shown by the dotted arrow V, dragging from the file 322 to the apparatus image layer 32), so the file 322 is dragged to the apparatus image layer 32. Then, the electronic apparatus 100 will perform a corresponding action based on the position of the file 322 so that the electronic device 12 corresponding to the apparatus image layer 32 can execute the file 322. For example, when the file 322 is saved in the electronic apparatus 100, the processing unit 102 may transmit the file 322 and a command to the electronic device 12 via the communication unit 110. Additionally, when the file 322 is saved in an electronic device (e.g. the electronic device 16) different from the electronic apparatus 100, the electronic apparatus 100 (DMC) sends a command for playing a file to a matching electronic device that plays the file, e.g. the electronic device 12 (DMP). After receiving the command, the electronic device 12 is connected to the electronic device 16 (DMS) where the file is saved to download the file and plays it. In addition, when the file 322 is saved in the electronic device 12, the electronic apparatus 100 only gives an executing command of play to the electronic device 12.

It should be noted that the processing unit 102 may also calculate a distance L2 between the electronic device 12 and the electronic apparatus 100 according to the position P of the electronic apparatus 100 and the position X2 of the electronic device 12, and adjusts a display size of the apparatus image layer 32 corresponding to the electronic device 12 according to the distance L2. For example, if the distance L2 between the electronic device 12 and the electronic apparatus 100 is longer, then the display size of the apparatus image layer 32 corresponding to the electronic device 12 in the display unit 108 is smaller. Relatively, if the distance L2 between the electronic device 12 and the electronic apparatus 100 is shorter, then the display size of the apparatus image layer 32 corresponding to the electronic device 12 in the display unit 108 is larger.

Specifically, in the example where the controllable target apparatus is the electronic device 12 and the electronic device 14, if the distance L2 between the electric device 12 and the electric apparatus 100 is greater than a distance L4 between the electronic device 14 and the electronic apparatus 100, then the display size of the apparatus image layer 32 corresponding to the electronic device 12 is larger than a display size of an apparatus image layer 34 corresponding to the electronic device 14. Certainly, in the embodiment, the processing unit 102 is not limited to adjusting the display size of the apparatus image layer based on the distance between the controllable target apparatus and the electronic apparatus 100. In other embodiments, the processing unit 102 may also adjust the display size of the apparatus image layer according to the user's setting.

It needs to be specifically pointed out that the processing unit 102 may also determine whether the distribution of the apparatus image layer of each of the controllable target apparatuses is overlapped or independent according to the position of each of the controllable target apparatuses, which is because the controllable target apparatuses may be placed at the same position; for example, a digital player is placed on a TV. Or, the controllable target apparatuses are located so close that the apparatus image layers are displayed to be overlap.

Figure 3B:
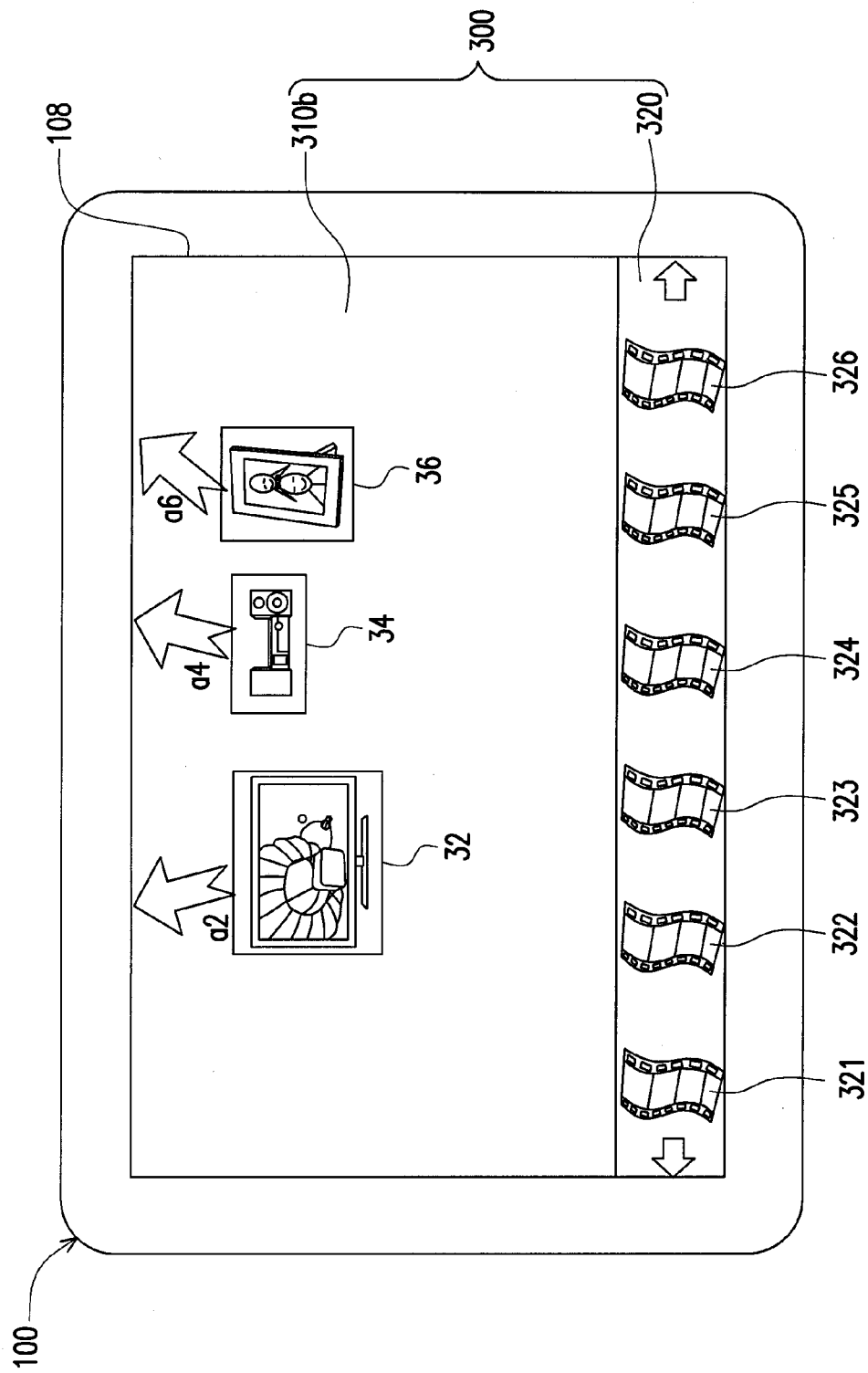
FIG. 3B is another schematic diagram illustrating showing the apparatus image layer in the display frame according to the second embodiment of the invention.

FIG. 3B is another schematic diagram illustrating showing the apparatus image layer in the display frame according to the second embodiment of the invention. The method for controlling the electronic device in the embodiment is similar to that for the electronic apparatus 100 illustrated in FIG. 3A. It is just that the displaying manner in the apparatus image layer display area 310b in FIG. 3B is different from that in the apparatus image layer display area 310a in FIG. 3A. In addition, in the embodiment, the apparatus image layer display area 310a of FIG. 3A may be switched to the apparatus image layer display area 310b of FIG. 3B via a mode switching button 312.

Referring to FIGS. 1A, 1B, and 3B, assume that the processing unit 102 obtains the plurality of controllable target apparatuses included in the scene and corresponding positions using the position P and the facing direction D. In FIG. 3B, the controllable target apparatus includes the electronic device 12, the electronic device 14, and the electronic device 16. When the sensing unit 112 detects that the electronic apparatus 100 is in a second operation mode (for example, the electronic apparatus 100 lies horizontally), the processing unit 102 displays a default view in the apparatus image layer display area 310b of the display unit 108, and displays an arrow pointing at the position of the controllable target apparatus according to the obtained position.

The default view is, for example, a background image layer that can be set by the user, and is compared with the position information of each electronic device in the target apparatus distribution database according to the facing direction of the electronic apparatus 100 held by the user as well as the user's current position (i.e. the current position of the electronic apparatus 100), so as to filter the electronic device that currently appears in the facing direction (i.e. the apparatus in front of the user) of the electronic apparatus 100 to be the controllable target apparatus. Moreover, an arrow is displayed in the background image layer to notify the user the position of the controllable target apparatus, and an apparatus image layer (e.g. an icon) that is saved in the target apparatus distribution database in advance by the controllable target apparatus during setting is also displayed.

Additionally, the default view may also use a floor layout diagram to be a background image layer; the floor layout diagram may be provided by the user for setting so that the format layout will be more accurate. Meanwhile, the floor wall position and the floor arrangement can be roughly judged based on collected RSSI. The apparatus image layer is piled up on the background image layer and illustrated according to a relative position of each electronic device in the apparatus distribution database and an apparatus image.

Take the electronic device 12 in the controllable target apparatus as an example, after the processing unit 102 obtains the position X2 of the electronic device 12, an arrow a2 pointing at the position X2 of the electronic device 12 will be displayed in the display unit 108. Likewise, if other controllable target apparatuses (e.g. at least one of electronic devices 13-18) are included in the scene, the processing unit 102 may also respectively display an arrow pointing at the position of the controllable target apparatus according to the position of other controllable target apparatuses in the default view.

In FIG. 3B, the controllable target apparatus includes the electronic device 12, the electronic device 14, and the electronic device 16. Assume that the positions of the electronic device 12, the electronic device 14, and the electronic device 16 are X2, X4, and X6, respectively. Accordingly, apart from the apparatus image layers 32, 34, and 36 of the electronic devices 12, 14, and 16 displayed in the apparatus image layer display area 310b, arrows a2, a4, and a6 are also displayed to respectively point at the positions of the electronic devices 14 and 16, i.e. the positions X2, X4, and X6. However, the embodiment provides no limitation to the number of the arrows being displayed. In addition, in the embodiment, it is not limited to use an arrow to point at the position of the controllable target apparatus. In other embodiments, the display unit 108 may point at the position to which the controllable target apparatus corresponds by other symbols. Thus, if the electronic apparatus 100 is in a second operation mode (for example, the electronic apparatus 100 lies horizontally), the user is also able to recognize the controllable target apparatus in the display unit 108 of the electronic apparatus 100, so that the user can control and operate the controllable target apparatus via the electronic apparatus 100.

In addition, the processing unit 102 not only displays the real scene (as shown in FIG. 3A) of the spatial area S in the facing direction D in the display unit 108, or displays the arrow pointing at the position of the controllable target apparatus (as shown in FIG. 3B) in the display unit 108, moreover, the processing unit 102 may also selectively make the apparatus image layer display area in the display area 108 to be presented in a virtual reality diagram (not shown) via a mode switching button 312.

For example, when the sensing unit 112 detects that the electronic apparatus 100 is in the first operation mode, as shown in FIG. 3A, the scene received via the image capturing unit 106 is displayed in the display unit 108. In the first operation mode, the display unit 108 displays the switching button 312. When it is detected that the electronic apparatus 100 is in the second operation mode, as shown in FIG. 3B, a default view is displayed in the display unit 108, and an arrow pointing at the position of the controllable target apparatus is displayed according to the obtained position of the controllable target apparatus. In the second operation mode, the display unit 108 does not display the switching button 312. That is, in the embodiment, the switching button 312 is automatically switched to be shown or not shown according to the operation mode of the electronic apparatus 100. However, in other embodiments, the switching button 312 may be designed to be permanently displayed in the display unit 108; the invention is not limited thereto. Please refer to the description in the first embodiment for the description regarding the first operation mode and the second operation mode. No further description is provided herein.

Based on the aforementioned, the processing unit 102 may display an augmented reality image in the display unit 108, i.e. a scene of the spatial area S in the facing direction D.

Moreover, the processing unit 102 may display the apparatus image layer corresponding to the controllable target apparatus at a corresponding position of the scene, so that the user is able to recognize the controllable target apparatus in a visualized and real augmented reality scene via the electronic apparatus 100.

In addition, in other embodiments, the electronic apparatus 100 may not need to employ the image capturing unit 106. When the electronic apparatus 100 does not include the image capturing unit 106, after the processing unit 102 uses the position P and the facing direction D to search in the target apparatus distribution database of the spatial area S, a plurality of controllable target apparatus (including the electronic devices 12, 14, and 16) included in the scene is obtained. In addition, the processing unit 102 may also obtain the information of the electronic devices 12, 14, and 16 (such as the names and icons). A default view is displayed in the apparatus image layer display area 310b of the display unit 108 so as to display the positions, names, and icons of the obtained electronic devices 12, 14, and 16 in the display unit 108, and an arrow is displayed to point at the position of each controllable target apparatus. Therefore, when the electronic apparatus 100 does not have the image capturing unit 106, the user is also able to recognize the controllable target apparatus in the display unit 108 of the electronic apparatus 100, thereby easily controlling and operating the controllable target apparatus via the electronic apparatus 100.

In addition, the apparatus image layer corresponding to all the electronic devices in the spatial area S may also be displayed in the display unit 108. For example, the processing unit 102 may display a layout diagram of the spatial area S in the apparatus image layer display area 310 of the display unit 108 to display the apparatus image layer corresponding to each electronic device in the corresponding position in the layout diagram according to the position of each electronic device.

In addition, in the method for controlling the electronic device, before the position P of the electronic apparatus 100 in the spatial area S and the facing direction D are obtained, the electronic apparatus 100 executes the positioning action first, thereby obtaining the position P of the electronic apparatus 100 in the spatial area S. One more example is provided below for further description.

Third Embodiment

Figure 4A:
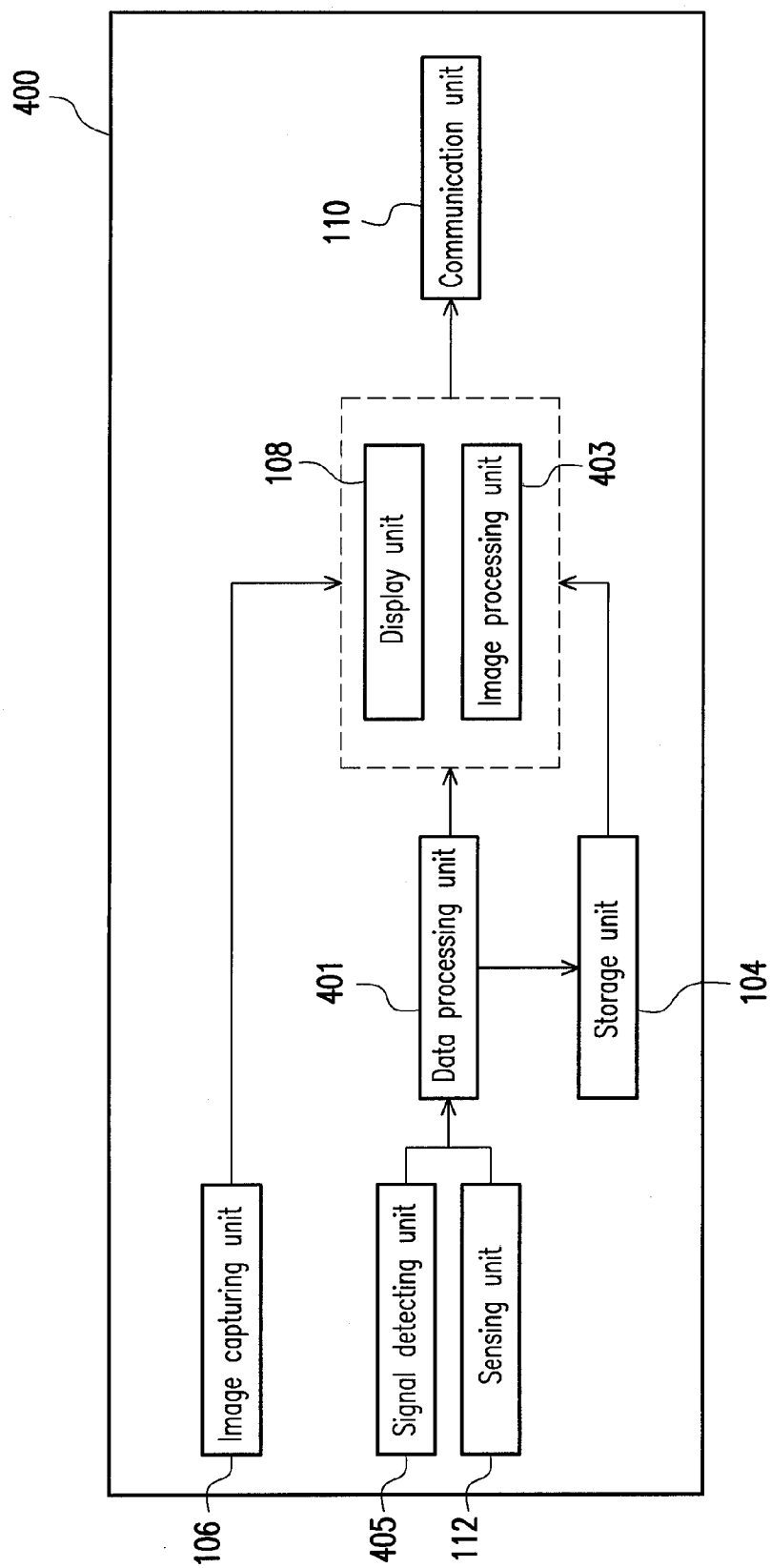
FIG. 4A is a block diagram illustrating an electronic apparatus according to a third embodiment of the invention.

FIG. 4A is a block diagram illustrating an electronic apparatus according to a third embodiment of the invention. Referring to both FIGS. 1B and 4A, an electronic apparatus 400 in FIG. 4A is similar to the electronic apparatus 100 in FIG. 1B, and the same reference numbers are used for denoting the elements with the same functions. The difference lies in that the electronic apparatus 400 in FIG. 4A further includes a data processing unit 401, an image processing unit 403, and a signal detecting unit 405. In the embodiment, the data processing unit 401 is, for example, the processing unit 102 in FIG. 1B; the image processing unit 403 is, for example, a graphic processing unit (GPU). In other embodiments, the function of the data processing unit 401 and the image processing unit 403 may be performed by CPU only.

The signal detecting unit 405 is, for example, a wireless receiving/transmitting unit, which is coupled to the data processing unit 401, and the data processing unit 401 performs the positioning action via the signal detecting unit 405, thereby obtaining the position of the electronic apparatus 400 in the spatial area.

In the positioning action performed by the data processing unit 401, the signal detecting unit 405 detects a plurality of signal strength values of a plurality of electronic devices in the spatial area. Moreover, the data processing unit 401 uses the signal strength values to obtain the position of the electronic apparatus 400 in the spatial area according to the target apparatus distribution database. Then, the data processing unit 401 transmits the position information of each obtained electronic device to the target apparatus distribution database of the storage unit 104, wherein the target apparatus distribution database may include a plurality of signal information and the position information of each electronic device. The signal information is the signal strength value respectively received from each electronic device in the plurality of coordinate positions in the spatial area. When it is desired to perform sharing resources in the display unit 108 in the electronic apparatus 400, the image processing unit 104 obtains the position of the electronic apparatus 400 in the spatial area from the data processing unit 401, and obtains the position information of each electronic device from the storage unit 104. Furthermore, a user interface may be displayed in the display unit 108 and the apparatus image layer is displayed in the user interface. The procedure of displaying the apparatus image layer is shown in steps S205-S208; no further description is incorporated herein.

Figure 4B:
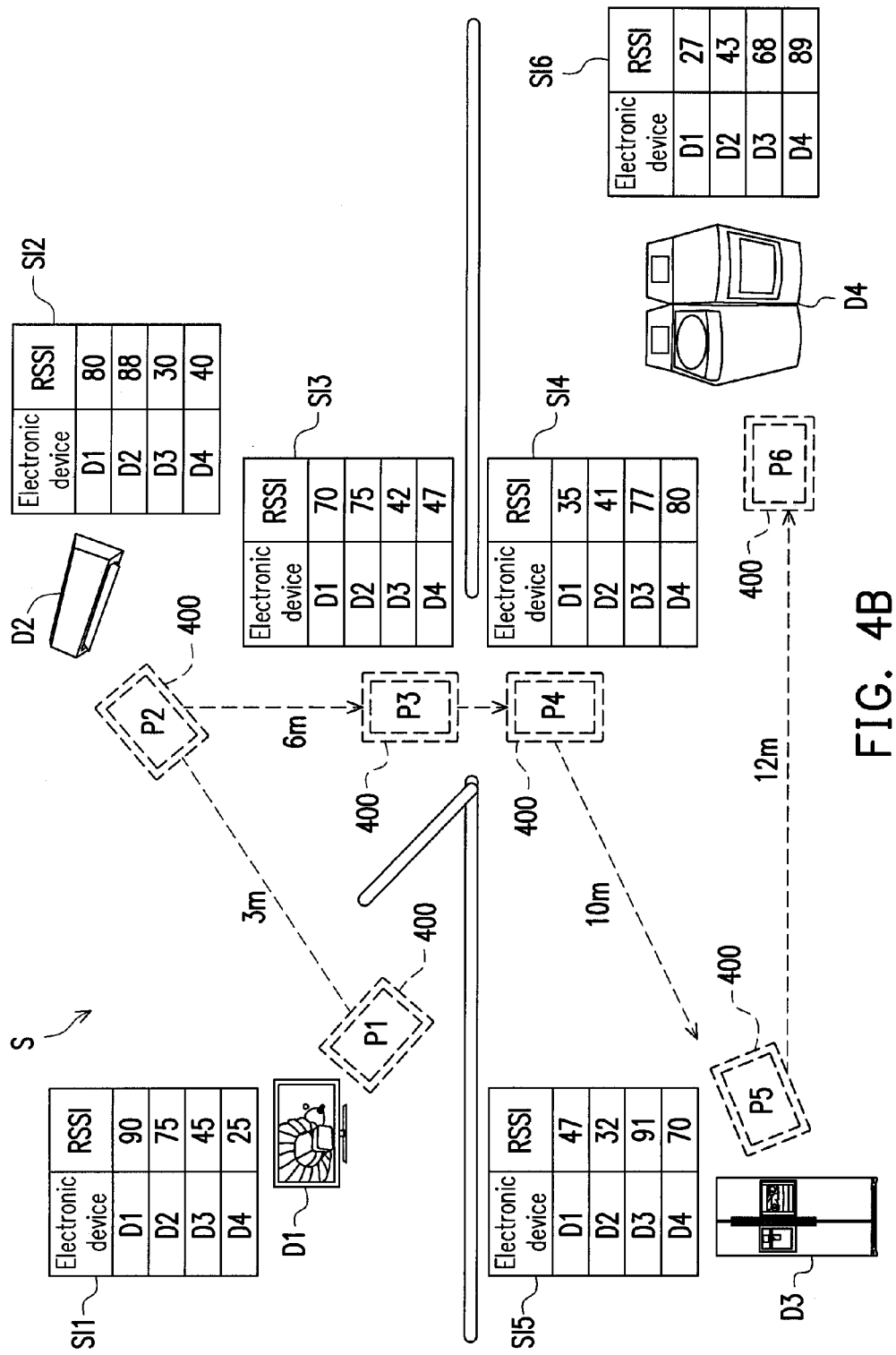
FIG. 4B is a schematic diagram illustrating a positioning action according to the third embodiment of the invention.

FIG. 4B is a schematic diagram illustrating a positioning action according to the third embodiment of the invention. As shown in FIG. 4B, assume that there are electronics devices D1-D4 in the spatial area S. The electronic apparatus 400 may detect the plurality of signal strength values from each of the electronic devices D1-D4 one by one at the plurality of coordinate positions. In the embodiment, the signal strength values are, for example, received signal strength indication (RSSI). Also, it is illustrated in the embodiment that the signal strength value of each of the electronic devices D1-D4 is measured only at six coordinate positions. However, in other embodiments, the signal strength value of each of the electronic devices D1-D4 may be measured at more coordinate positions.

The user may hold the electronic apparatus 400 (e.g. a tablet PC) to move from a coordinate position P1 to a position P2 along the dotted arrow and record the moving direction and distance in the electronic apparatus 400, and then sequentially move to a coordinate position P3, a coordinate position P4, a coordinate position P5, and a coordinate position P6 along the dotted arrow. Assume that a distance between the coordinate positions P1-P2 is 3 meters; a distance between the coordinate positions P2-P3 is 6 meters; a distance between the coordinate positions P3-P4 is 2 meters; a distance between the coordinate positions P4-P5 is 10 meters; a distance between the coordinate positions P5-P6 is 12 meters.

The signal strength value obtained from each electronic device D1-D4 via the signal detecting unit 405 at the coordinate positions P1-P6 in the electronic apparatus 400 is signal information SI1-SI6. Take the signal information SI1 as an example, since the electronic apparatus 400 is closest to the electronic device D1 when it is at the coordinate positions P1 and furthest from the electronic device D4, the signal strength value detected from the electronic device D1 is the highest; the signal strength value detected from the electronic device D4 is the lowest. After the data processing unit 401 obtains the signal information SI1-SI6 respectively at the coordinate positions P1-P6, the signal information SI1-SI6 are recorded into the target apparatus distribution database in the storage unit 104.

Figure 4C:
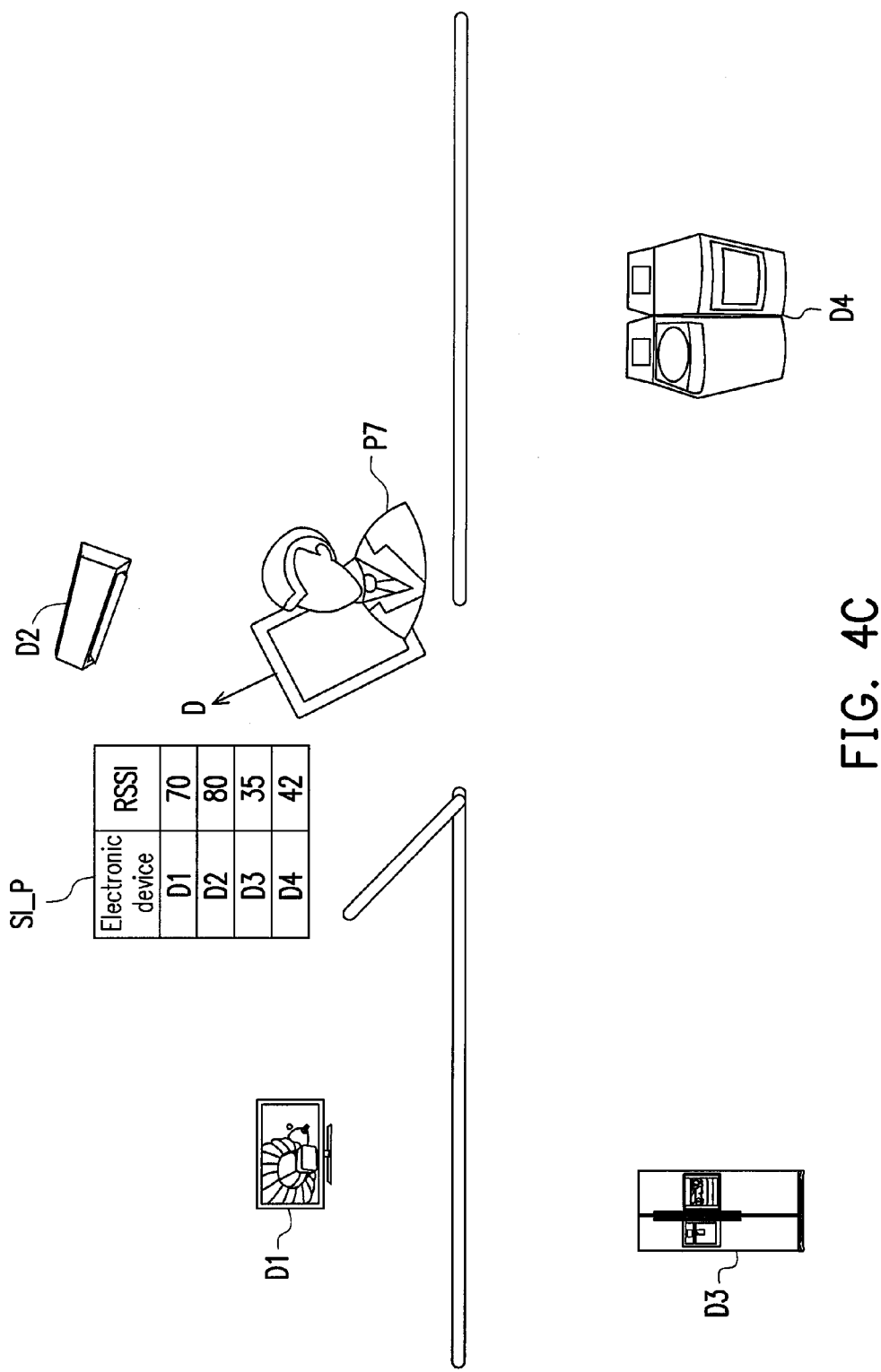
FIG. 4C is a schematic diagram illustrating detecting a signal according to the third embodiment of the invention.

After performing of the positioning action, the electronic apparatus 400 is capable of calculating a current position P7 of the electronic apparatus 400 in the spatial area S using the target apparatus distribution database. For example, FIG. 4C is a schematic diagram illustrating detecting a signal according to the third embodiment of the invention. In FIG. 4C, after the positioning action is performed, the user at the position P7 holding the electronic apparatus 400 acquires the facing direction D using the sensing unit 112. In the embodiment, signal information SI_P is obtained using the signal detecting unit 405. Therefore, the data processing unit 401 is capable of calculating the coordinate position of the position P7 in the spatial area S using the signal information SI_P and the signal information SI1-SI6 of each coordinate position P1-P6, thereby the method for controlling the electronic device as described in the first embodiment can be conducted. Moreover, the user interface as shown in FIG. 3A or 3B is displayed in the display unit 108.

In addition, when the detected position of the apparatus image layer is incorrect, the position of the apparatus image layer can be moved by operation gestures such as dragging in the display unit 108.

For example, FIGS. 5A-5D are schematic diagrams illustrating moving the apparatus image layer according to the third embodiment of the invention. In the embodiment, the electronic apparatus 400 in FIG. 4A is used as an example.

In FIG. 5A, the electronic apparatus 400 infers the position coordinate (x, y) of the electronic apparatus 400 according to the position information and signal information of the electronic device D1 recorded in the target apparatus distribution database as well as the signal information and facing direction detected by the electronic apparatus 400.

When the user judges that the position displayed by the apparatus image layer of the electronic device D1 is different from the actual position, it means that the position coordinate of the electronic apparatus 400 is incorrect. As shown in FIG. 5B, in the display unit 108 of the electronic apparatus 400, a position 501 displayed by an apparatus image layer 510 of an electronic device A does not match an actual position 503. Then, the user can move the apparatus image layer 510 by an operation gesture such as dragging from the position 501 to the position 503.

Figure 5C:
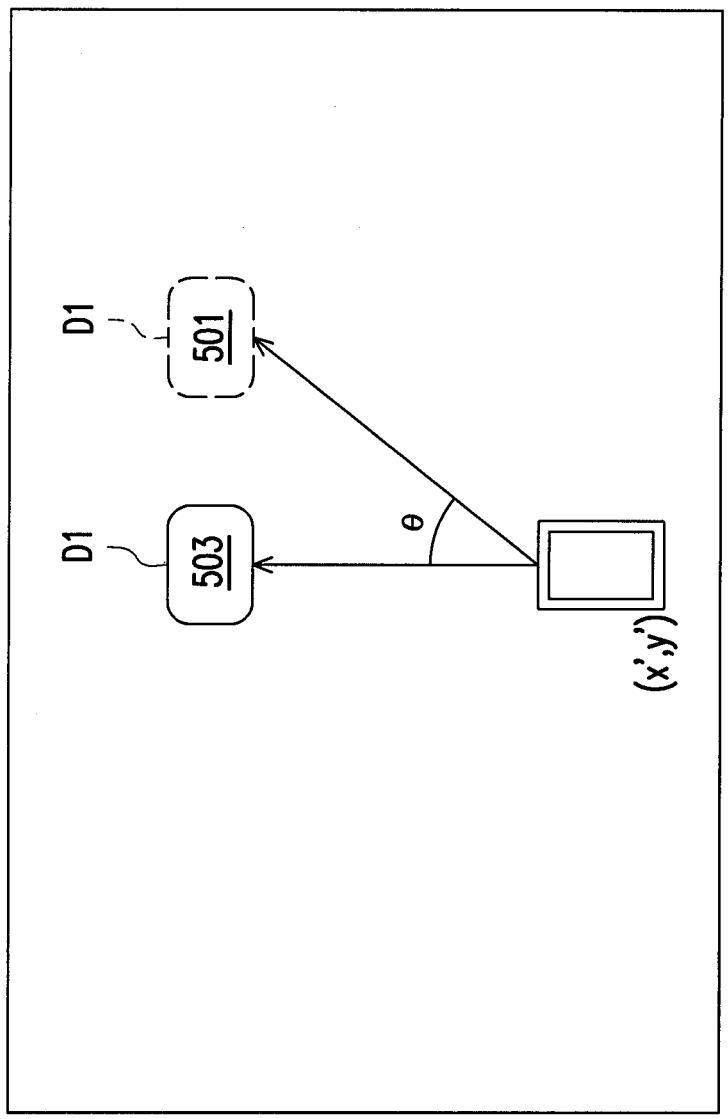
Figure 5D:
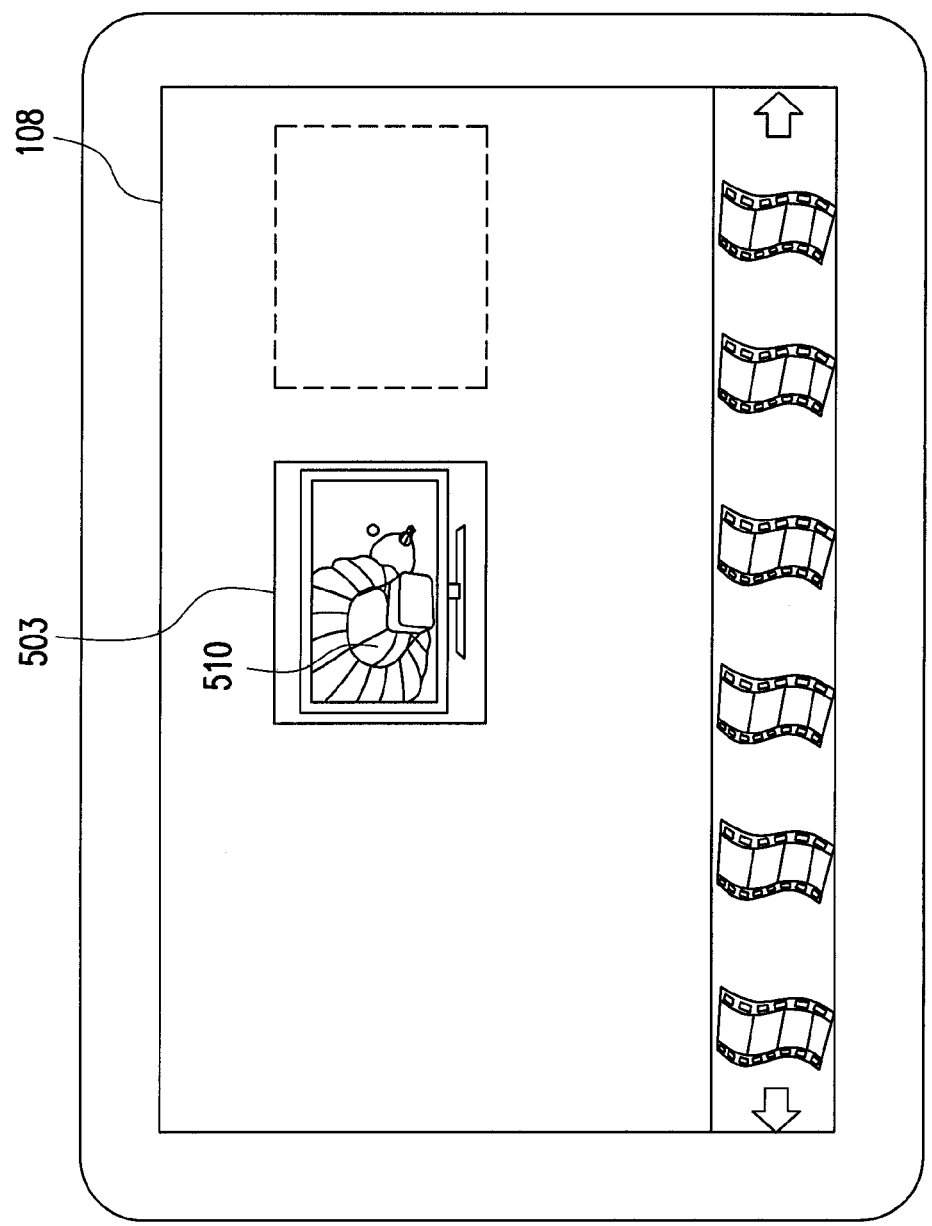

Next, referring to FIG. 5C, when the apparatus image layer 510 is moved to the position 503, the electronic apparatus 400 will calculate a changed corresponding angle θ according to the dragging distance, and to re-calculate the correct position coordinate (x', y') of the electronic apparatus 400. Thereafter, the signal information of the re-calculated position coordinate will be updated in the target apparatus distribution database. After the apparatus image layer 510 is moved to the position 503, as shown in FIG. 5D, the apparatus image layer 510 in the display unit 108 will be displayed at the position 503.

Figure 6B:
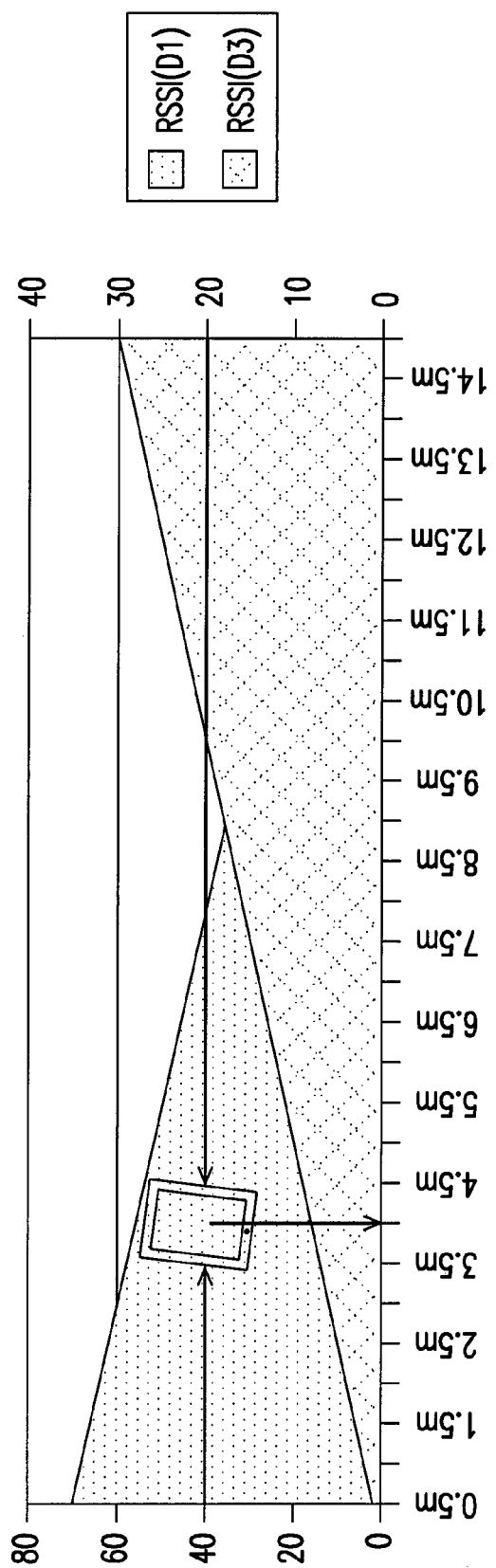
Figure 6C:
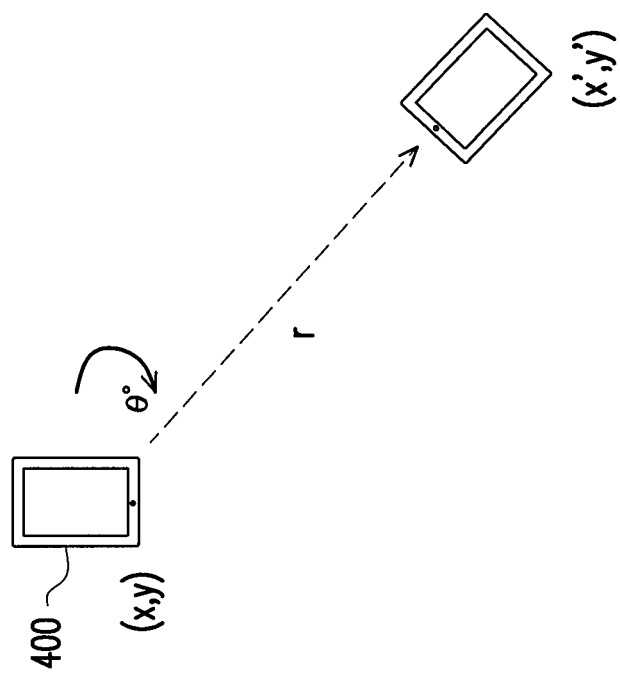

FIGS. 6A-6C are schematic diagrams illustrating calculating a position of the electronic apparatus according to the third embodiment of the invention. As shown in FIGS. 6A and 6B, the position where the electronic apparatus 400 is located is automatically adjusted via the RSSI value. For example, when the user is in a certain area, and the position information of the area is not recorded in the target apparatus distribution database, the electronic apparatus 400 is capable of automatically calculating the coordinate position of the electronic apparatus 400 according to the RSSI value corresponding to other electronic device 610 and the electronic device 620, as shown in FIG. 6B, for example, corresponding to the position information and signal information of the electronic device D1 (similar to the electronic device 610) and the electronic device D3 (similar to the electronic device 620) in the target apparatus distribution database.

Moreover, as shown in FIG. 6C, the position of the electronic apparatus 400 is automatically adjusted via the inertial navigation system (INS) data. That is, when the electronic apparatus 400 is moved to an area that is not recorded (i.e. there is no relevant information of the area in the target apparatus distribution database), a corresponding position information can be found on the map of the area according to a moving distance r and direction of the electronic apparatus 400. Then, the coordinate position and signal information of the electronic apparatus 400 can be updated in the target apparatus distribution database.

To sum up, in the aforementioned embodiments, through the position and the facing direction of the electronic apparatus, the electronic apparatus is capable of obtaining the controllable target apparatus included in the scene and the position of the controllable target apparatus. Moreover, the electronic apparatus is capable of displaying the apparatus image layer corresponding to the controllable target apparatus at the corresponding position of the scene according to the position of the controllable target apparatus. Besides, when the apparatus image layer corresponding to the controllable target apparatus receives the enabling signal, the electronic apparatus is capable of controlling and operating the controllable target apparatus and the file corresponding to the apparatus image layer. Accordingly, the user is able to directly recognize the controllable target apparatus through the apparatus image layer in the electronic apparatus, thereby accurately determining the controllable target apparatus to be controlled.

Although the invention has been disclosed by the above embodiments, the embodiments are not intended to limit the invention. It will be apparent to those skilled in the art that various modifications and variations can be made to the structure of the invention without departing from the scope or spirit of the invention. Therefore, the protecting range of the invention falls in the appended claims.

What is claimed is:

1. A method for controlling an electronic device, for an electronic apparatus, comprising:
   obtaining a position of the electronic apparatus in a spatial area;
   displaying a scene of the spatial area where the electronic apparatus is located in a display unit connected to the electronic apparatus;
   obtaining a position of a controllable target apparatus included in the scene and obtaining a relative position of the controllable target apparatus and the electronic apparatus by using the position of the electronic apparatus and searching in a target apparatus distribution database of the spatial area;
   dynamically displaying an apparatus image layer, by the electronic apparatus, corresponding to the controllable target apparatus at a corresponding position of the scene according to the obtained relative position of the controllable target apparatus and the electronic apparatus; and
   transmitting a controlling command to the controllable target apparatus corresponding to the apparatus image layer via a network connection, when the apparatus image layer receives an enabling signal.

2. The method for controlling the electronic device according to claim 1, wherein the spatial area comprises a plurality of electronic devices, and the controllable target apparatus is one of the electronic devices, further comprising:
   performing a positioning action, so as to obtain the position of the electronic apparatus in the spatial area, wherein performing the positioning action comprises steps of:
      detecting a plurality of signal strength values of the electronic devices in the spatial area via a signal detecting unit; and
      obtaining the position of the electronic apparatus in the spatial area using the plurality of signal strength values according to the target apparatus distribution database.

3. The method for controlling the electronic device according to claim 2, wherein the target apparatus distribution database comprises a plurality of signal information and a position information of each of the plurality of electronic devices, wherein the plurality of signal information are the signal strength values respectively received from the plurality of electronic devices in a plurality of coordinate positions of the spatial area.

4. The method for controlling the electronic device according to claim 1, wherein dynamically displaying the apparatus image layer corresponding to the controllable target apparatus in the corresponding position of the scene according to the obtained relative position of the controllable target apparatus and the electronic apparatus further comprises steps of:
   dynamically calculating a distance between the controllable target apparatus and the electronic apparatus according to the position of the electronic apparatus and the position of the controllable target apparatus; and
   adjusting a display size of the apparatus image layer according to the distance.

5. The method for controlling the electronic device according to claim 1, wherein dynamically displaying the apparatus image layer corresponding to the controllable target apparatus in the corresponding position of the scene according to the obtained relative position of the controllable target apparatus and the electronic apparatus further comprises a step of:
   if the scene comprises another controllable target apparatus, determining whether a distribution of the apparatus image layer and the another apparatus image layer is overlapped or independent according to respective positions of the controllable target apparatus and the another controllable target apparatus.

6. The method for controlling the electronic device according to claim 1, wherein displaying the scene of the spatial area where the electronic apparatus is located in the display unit connected to the electronic apparatus comprises a step of:
   receiving the scene of the spatial area where the electronic apparatus is located via an image capturing unit so as to display the scene in the display unit.

7. The method for controlling the electronic device according to claim 6, wherein displaying the scene of the spatial area where the electronic apparatus is located in the display unit connected to the electronic apparatus further comprises steps of:
   when detecting that the electronic apparatus is in a first operation mode, displaying the scene received via the image capturing unit in the display unit; and
   when detecting that the electronic apparatus is in a second operation mode, displaying a default view, and displaying an arrow pointing at the position of the controllable target apparatus according to the obtained relative position of the controllable target apparatus and the electronic apparatus.

8. The method for controlling the electronic device according to claim 1, wherein displaying the scene of the spatial area where the electronic apparatus is located in the display unit connected to the electronic apparatus comprises a step of:
   receiving the scene of the spatial area where the electronic apparatus is located via an image capturing unit, so as to display an augmented reality image of the scene in the display unit, wherein the augmented reality image corresponds to the scene.

9. The method for controlling the electronic device according to claim 7, wherein displaying the scene of the spatial area where the electronic apparatus is located in the display unit connected to the electronic apparatus further comprises steps of:
when detecting that the electronic apparatus is in a first operation mode, displaying the augmented reality image of the scene in the display unit, wherein the augmented reality image corresponds to the scene; and
when detecting that the electronic apparatus is in a second operation mode, displaying a default view, and displaying an arrow pointing at the position of the controllable target apparatus according to the obtained relative position of the controllable target apparatus and the electronic apparatus.

10. The method for controlling the electronic device according to claim 1, wherein displaying the scene of the spatial area where the electronic apparatus is located in the display unit connected to the electronic apparatus comprises a step of:
displaying a layout diagram of the spatial area in the display unit, wherein the layout diagram corresponds to the scene.

11. An electronic apparatus, comprising:
a processing unit, obtaining a position of the electronic apparatus in a spatial area;
a storage unit, coupled to the processing unit and storing a target apparatus distribution database of the spatial area;
a display unit, coupled to the processing unit and displaying a scene of the spatial area where the electronic apparatus is located;
a sensing unit, coupled to the processing unit and detecting a facing direction of the electronic apparatus; and
a communication unit, coupled to the processing unit;
wherein the processing unit obtains a relative position of a controllable target apparatus and the electronic apparatus comprised in the scene by using the position of the electronic apparatus and the target apparatus distribution database; the processing unit decides the scene displayed by the display unit according to the detected facing direction; and the processing unit dynamically displays an apparatus image layer corresponding to the controllable target apparatus at a corresponding position of the scene via the display unit according to the obtained relative position of the controllable target apparatus and the electronic apparatus; when the apparatus image layer receives an enabling signal, the processing unit transmits a controlling command to the controllable target apparatus corresponding to the apparatus image layer via the communication unit.

12. The electronic apparatus according to claim 11, further comprising:
a signal detecting unit, coupled to the processing unit and detecting a plurality of signal strength values of a plurality of electronic devices in the spatial area, wherein the controllable target apparatus is one of the electronic devices;
wherein the processing unit obtains the position of the electronic apparatus in the spatial area by using the plurality of signal values to according to the target apparatus distribution database.

13. The electronic apparatus according to claim 12, wherein the target apparatus distribution database comprises a plurality of signal information and a position information of each of the electronic devices, wherein the signal information are signal strength values respectively received from the electronic devices in a plurality of coordinate positions of the spatial area.

14. The electronic apparatus according to claim 11, wherein the processing unit calculates a distance between the controllable target apparatus and the electronic apparatus according to the positions of the electronic apparatus and the controllable target apparatus, and adjusts a display size of the apparatus image layer according to the distance.

15. The electronic apparatus according to claim 11, further comprising:
an image capturing unit, coupled to the processing unit, and the processing unit receives the scene of the spatial area in the facing direction via the image capturing unit so as to display the scene in the display unit.

16. The electronic apparatus according to claim 15, wherein when the sensing unit detects that the electronic apparatus is in a first operation mode, the scene received via the image capturing unit is displayed in the display unit.

17. The electronic apparatus according to claim 11, further comprising:
an image capturing unit, coupled to the processing unit, and the processing unit receives the scene of the spatial area in the facing direction via the image capturing unit so as to display an augmented reality image of the scene in the display unit.

18. The electronic apparatus according to claim 17, wherein when the sensing unit detects that the electronic apparatus is in a first operation mode, the processing unit displays the augmented reality image of the scene in the display unit, wherein the augmented reality image corresponds to the scene.

19. The electronic apparatus according to claim 11, wherein when the sensing unit detects that the electronic apparatus is in a second operation mode, the processing unit displays a default view in the display unit, and displays an arrow pointing at the position of the controllable target apparatus according to the obtained relative position of the controllable target apparatus and the electronic apparatus.

20. The electronic apparatus according to claim 11, wherein when the sensing unit detects that the electronic apparatus is in a second operation mode, the processing unit displays a layout diagram of the spatial area in the display unit, wherein the layout diagram corresponds to the scene.

* * * * *